May 22, 1956
S. J. USACK
2,746,515
METHOD OF APPLYING WHITE AND COLORED SIDE WALLS TO BLACK TIRES
Filed Dec. 17, 1953
2 Sheets-Sheet 1
FIG. I.
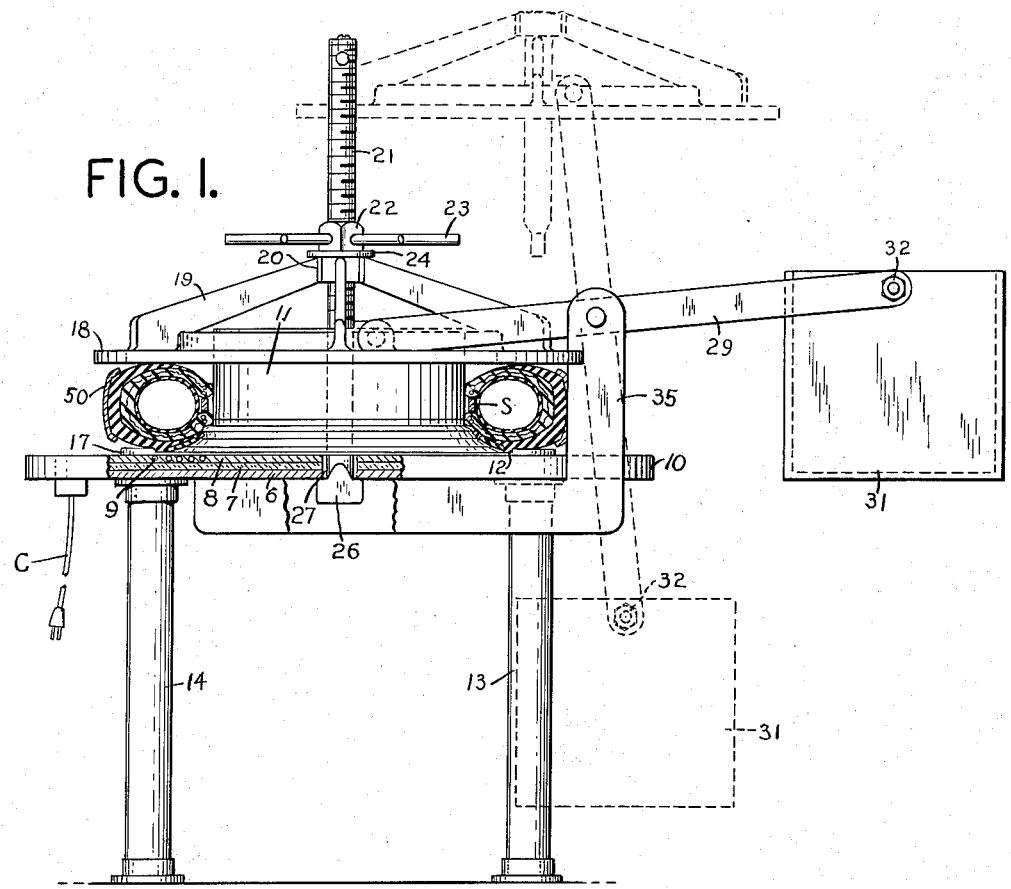
FIG. 2.
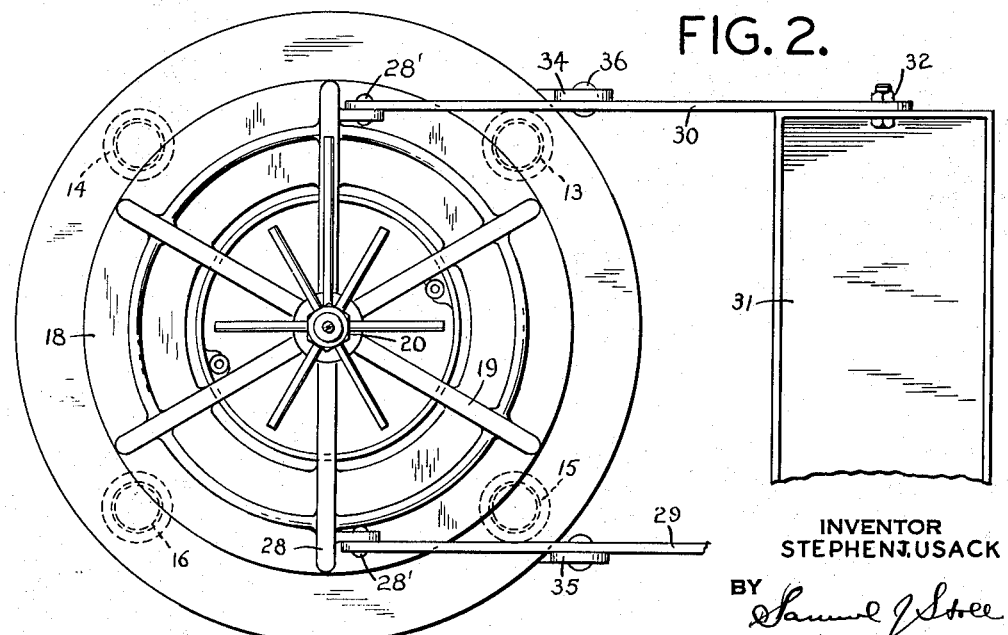
INVENTOR
STEPHEN J. USACK
BY *Samuel J. Stree*
ATTORNEY May 22, 1956
S. J. USACK
2,746,515
METHOD OF APPLYING WHITE AND COLORED
SIDE WALLS TO BLACK TIRES
Filed Dec. 17, 1953
2 Sheets-Sheet 2
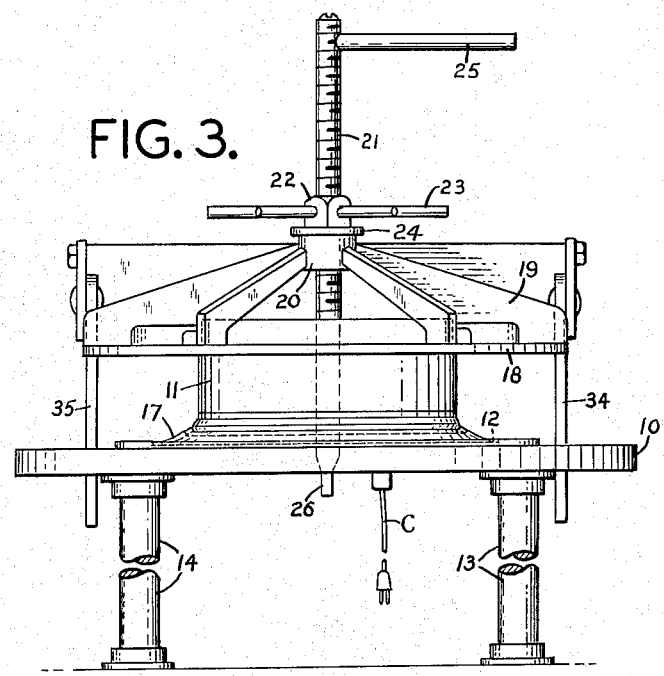
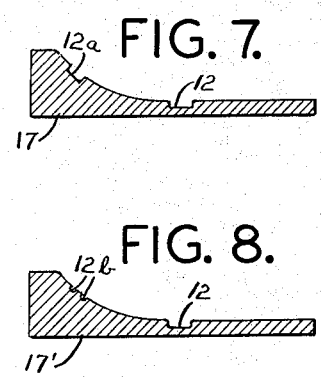
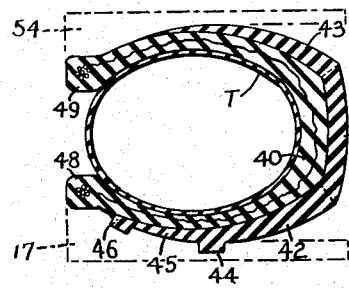
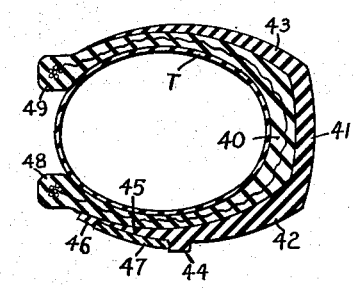
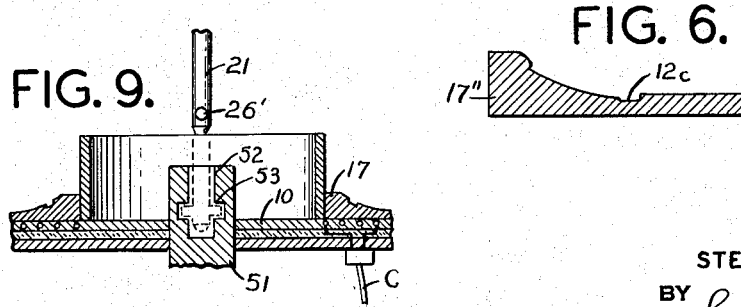
INVENTOR
STEPHEN J. USACK
BY
ATTORNEY

United States Patent Office 2,746,515
Patented May 22, 1956

2,746,515

METHOD OF APPLYING WHITE AND COLORED SIDE WALLS TO BLACK TIRES

Stephen J. Usack, Richmond Hill, N. Y.

Application December 17, 1953, Serial No. 398,817

6 Claims. (Cl. 154—14)

This invention relates to a new method and new means of applying white and colored side walls to black tires. The invention relates particularly to the application of white and colored side walls to used and worn black tires but it is equally applicable to new and unused black tires. The invention also relates to a recapping or re-covering process for used and worn tires, especially, but not necessarily, black tires. In this recapping or re-covering process, white or colored walls are applied to the tires and scuff-resistant protective beads are also provided to prevent scuffing of the wihte or colored walls.

In the process of making new tires, different materials are used depending upon whether the new tires are to be all black or are to have a white or other light-colored side wall. In the making of white and colored side wall tires, non-staining materials are used throughout the entire operation. In black tire production, however, the opposite is true and the materials used are virtually all of a staining nature. The staining materials tend to migrate and spread and they would soon permeate and discolor any white or colored side wall that might be applied to tires of this nature. It has accordingly heretofore been found extremely difficult, and indeed impossible, to apply a white or colored side wall to an all black tire. This condition has especially been true of used and worn black tires since in addition to the staining materials of which they are made, they are also permeated with grease and oil and particles of asphalt and other foreign matter which are at least equally injurious to white and colored side walls, causing discoloration and other undesirable and harmful results.

The principal object of this invention is the provision of a method of applying white or colored side walls to black tires without risk of discoloration or other harmful consequences. The key step in this method involves the treatment of the tire to remove all traces of anti-oxidants, greases, oils and other foreign materials that might prove deleterious to the white or colored side walls or that might cause their discoloration. This key step may be applied to both new and used tires of all-black construction and it may also be applied to used and worn white wall tires. Without this step the process of applying a white or colored side wall to a new or used black tire and even to a used white or colored wall tire would fail.

Another important object of this invention is the provision of scuff-resistant means for preventing scuffing of a white or colored side wall, especially of a used tire. In the recapping or re-covering of a tire of this nature, a black outer side wall having at least one bead is applied to the tire, this, of course, being in addition to the rubber which forms the tread of the tire and such rubber as may be applied to the opposite side wall of the tire. The black outer side wall serves as a base for the white or colored side walls and the bead or beads serve as shoulders against which the side edges of the white or colored side wall abut. One of these beads, situated where the tire would normally be expected to make contact with a sidewalk curb, projects a substantial distance outwardly beyond the white or colored side wall to protect the same from contact wtih the curb.

In addition to preventing scuffing of the white or colored side wall, the raised bead or beads serve as very satisfactory edging for the white or colored side wall so as to finish it off neatly and precisely. It should be understood that tires of a given size vary in their dimensions both when they are brand new and particularly when they are worn. This is not only true of tires made by different manufacturers but it is also true of tires made by the same manufacturer. They stretch unevenly and some tires will stretch more than others. It is therefore essential, when applying a white or colored side wall thereto, to provide an edging against which the white or colored side wall is to be placed, and preferably two edgings which are spaced apart a distance substantially equal to the width of the white or colored side walls. In the preferred form of this invention, these two edgings would constitute a pair of raised beads which are connected to each other by means of a thin web which serves as a base for the white or colored side wall. Since the beads or edgings form part of a new covering for the tire, it is immaterial to what extent the tire is stretched or distorted and it is immaterial whether the tire is over size or under size: The new covering with its spaced beads or edgings will snugly and precisely accommodate the white or colored side wall.

The raised bead or beads also perform another function and reference is here made particularly to the bead which is situated in the area of expected contact between the tire and a sidewalk curb. This bead is made of non-staining material and it serves as a barrier or buffer between the tread of the tire which is normally made of staining materials and the white wall or colored wall which this invention contemplates. In other words, this bead would prevent the staining materials from flowing or migrating into contact with the white or colored side wall.

Still another important object of this invention is the provision of novel and improved vulcanizing apparatus for recapping, re-treading or re-covering used tires and for applying white or colored side walls thereto. The apparatus is counter-balanced in the sense that it possesses a fixed vulcanizing plate or platen and a movable vulcanizing plate or platen and means for counter-balancing the weight of the movable plate or platen to facilitate moving it either toward or away from the fixed plate or platen. The movable plate or platen is mounted on a horizontal pivot and on the opposite side of the pivot is a counter-weight. Screw and nut means are provided to lock the fixed and movable platens together and to apply such pressure upon the tire being vulcanized as may be necessary. The nut member of such means engages, directly or indirectly, the movable platen. The screw member of such means engages the fixed platen. In conventional apparatus of this general character, the screw is permanently secured to the fixed platen and the nut must be entirely disengaged from the screw in order to free the movable platen. In the present apparatus, the screw is removably secured to the fixed platen and all that need be done is to turn the screw a quarter-turn in order to free it from the fixed platen. A quarter-turn will also re-attach the screw to the fixed platen. It is therefore no longer necessary to completely remove the nut from the screw in order to free the movable platen from the fixed platen. All that need be done is to loosen the nut slightly on the screw and give the screw a one-quarter turn. The counter-balanced movable platen, together with the nut and screw means, may now be moved away from the fixed platen and from the tire thereon.

The invention is illustrated in the accompanying drawing in which:

Fig. 1 is a side elevational view of a novel apparatus according to the invention.

Fig. 2 is a plan view of the apparatus of Fig. 1.

Fig. 3 is a front elevational view of the apparatus of Fig. 1.

Fig. 4 is a sectional view of a tire showing a step in the method according to the invention of applying a side wall cover to a tire.

Fig. 5 is a sectional view of a tire made in accordance with the present invention.

Fig. 6 is a sectional view of a side wall forming and curing plate employed in the apparatus of Fig. 1.

Figs. 7, 8 are sectional views of a side wall forming and curing plates either of which may be employed in the apparatus of Fig. 1.

Fig. 9 is a fragmentary sectional view showing a modification of a portion of the apparatus embodying the invention.

It will be understood in practicing this invention that the principles of the invention may be applied to a new tire or to a used tire and, in the latter case, the used tire may be recapped, re-covered or re-treaded prior to the application of this invention, but the invention may be practiced by simply confining it to only one side wall of the tire as in the case of a new tire. Should it be desired, in dealing with a used tire, to recap or re-cover the tire before affixing thereto a white or colored side wall, then conventional vulcanizing equipment, including a conventional mold, may be employed for this purpose. Only one vulcanizing plate or ring would be specifically related to the present invention and this would be the one which prepares the outer side wall of the tire for the strip of white or colored rubber.

The vulcanizing equipment shown in the drawing and herein claimed may also be used to prepare the tire for the application of a white or colored rubber strip. The equipment is shown in the drawing with only the one vulcanizing plate or ring needed for preparing the outer side wall of the tire. The other vulcanizing plates or rings, such as those required for molding and vulcanizing the tread of the tire and the one used for vulcanizing and molding the opposite or inner side wall of the tire, are not shown in the drawing simply for purposes of clarity. The same vulcanizing equipment shown in the drawing may also be used for vulcanizing or otherwise applying the white or colored rubber strip to the outer side wall of the tire. In place of the vulcanizing plate or ring above mentioned for preparing the outer side wall of the tire for the white or colored rubber strip, there would be substituted another vulcanizing plate or ring which would secure the white or colored rubber strip to the prepared outer side wall of the tire. The vulcanizing apparatus is accordingly shown and described without special regard to whether it is to be used for preparing the side wall of the tire for the white or colored rubber strip or for applying said white or colored rubber strip thereto. As has above been indicated, the apparatus would generally be the same save for the inclusion or installation of such vulcanizing plates or rings as may be required for a particular job.

It will therefore be clearly understood that the invention contemplates the steps of recapping or re-covering a worn tire and the simultaneous preparation of the outer side wall thereof for application of a white or colored rubber strip. The same molding and vulcanizing means which recaps or re-covers the tire also molds and prepares the outer side wall thereof preparatory to the application of the white or colored rubber strip. But the invention also contemplates the application of such rubber strip to a new tire and to a used tire which is not to be recapped or re-covered. In such case, the invention would involve the two steps of preparing the outer side wall of the tire to receive the rubber strip and then applying said rubber strip thereto.

Referring now to the vulcanizing apparatus generally, without indicating whether it is to be used to recap a tire or to apply a white or colored side wall thereto, it will be noted that a strong platform 10 is provided on flanged legs 13, 14, 15 and 16. Platform 10 is substantially of disc-shape and it may serve as the bed or base of the apparatus. Platform 10 is of multi-layered construction, consisting of a base plate 6, an insulating layer 7 and a heating plate 8. Within the heating plate are disposed heater coils or resistance elements arranged annularly or spirally in heating plate 8. Above the coils 9 and mounted on heating plate 8 is an annular vulcanizing plate 17. This will be seen in Figs. 3 and 7. If desired, annular plate 17' shown in Fig. 8 may be used in the place and stead of annular plate 17. The differences between these two annular plates or rings will shortly be described. When either of these two rings is used as indicated, it would simply be for the purpose of re-covering the outer side wall of a tire. Annular plate 17'' may, however, be substituted for the plates shown in Figs. 7 and 8 and in such case the apparatus would be used to apply a white or colored side wall to the side wall formed by either of said plates shown in Figs. 7 and 8. Thus, in Fig. 1 plate 17'' is shown to be employed for the purpose of applying a white or colored side wall to the tire.

A collar or cylinder 11 is mounted on platform 10 and when any one of the three vulcanizing rings shown in Figs. 6, 7 and 8 is laid upon platform 10, it encircles and is positioned by said collar or cylinder 11. Suspended above platform 10, in spaced relation thereto, and encircling collar or cylinder 11, is an annular plate 18 which is supported by a plurality of radially extending arms 19 which are secured to a hub 20. Members 18, 19 and 20 together comprise what may be described as a spider or the movable pressure plate or platen of the entire piece of apparatus. A tire would be placed between one of the vulcanizing rings 17, 17' and 17'' and said platen 18 and the tire would, of course, encircle the collar or cylinder 11.

Hub 20 serves as a thrust bearing. A threaded rod or screw 21 passes vertically through hub 20. A thrust nut 22 is threaded onto screw 21 for engagement with hub 20. Arms 23 extend radially outwardly from nut 22 and serve as handles or levers to turn said nut on said screw 21 in either direction. A washer 24 may be interposed between the nut and hub 20 in order to lessen the friction. Screw 21 is provided with a handle 25 at its upper end so that said screw may be turned in either direction about its own longitudinal axis. The lower end of the screw is flattened and widened to form a relatively flat blade or key 26 which is adapted to extend through a slot 27 in platform 10. Slot 27 is so shaped that key 26 may pass through when said key occupies a given angular position relative to said slot. When screw 21 is turned by means of handle 25 to another position, say 90 degrees removed from the first position, key 26 will be prevented from passing through slot 27. See Fig. 1. Consequently, screw 21 will be locked in position relative to platform 10 and it will not be possible to withdraw said screw from platform 10 unless and until said screw is turned 90 degrees to its original position or to a position 180 degrees removed therefrom.

When nut 22 is now turned by means of handles 23, it becomes possible to exert a downward force upon the spider (hub 20, arms 19 and platen 18) and an upward force upon platform 10. Since platform 10 is fixed in position, the net result will be to bring said spider 20, 19 and 18 downwardly into pressure engagement with any tire that may be mounted on platform 10. By the same token, nut 22 may be turned in the opposite direction to ease up on the pressure which the spider exerts upon the tire and handle 25 may then be used to turn the screw 21 90 degrees in order to free its key 26 for removal through slot 27.

L-shaped arms 34 and 35 are secured to platform 10 as shown in Figs. 1 and 2. At the upper ends of said L-shaped arms 34 and 35 are pins or rivets 36 which serve as pivots for arms 29 and 30. A counter-weight 31 swings from the outer ends of said arms 29 and 30 by means of bolts 32 which serve as pivots for this purpose. The opposite or inner ends of arms 29 and 30 are connected by means of pins or rivets 28' to extended arms 28 on platen 18. These pins or rivets 28' serve as pivots between arms 29 and 30 on the one hand and extended arms 28 on the other hand. It will now be seen that counter-weight 31 counter-balances the entire assembly consisting of screw 21, nut 22, the handles on said screw and nut, hub 20, arms 19 and 28 and platen 18. The solid and dotted lines in Fig. 1 show two positions of this assembly, the solid lines indicating its operative position and the dotted lines its inoperative position. When the assembly is in its inoperative position, a tire may be placed in position on platform 10 or removed therefrom with great ease.

The method of recapping a tire outlined above by employing the apparatus of Figs. 1, 2 and 3 will now be described in greater detail. A tire casing 40, such as is shown in Figs. 4 and 5, is buffed or roughened in conventional manner. It is assumed that tire casing 40 is of a used and worn tire but it will be understood that the present invention may also be applied, as has above been stated, to a new and unused tire. After the casing is buffed or roughened it is treated with a chemical solution to condition it for further processing. This chemical solution removes from the casing all unwanted and harmful substances which would tend to discolor or otherwise adversely affect a white or colored side wall. The solution removes all staining resins, anti-oxidants, greases and oils which are normally present in black wall tires. Suitable solutions for this purpose may be given as follows:

The basic solution consists of a solvent and a penetrating, wetting or dispersing agent. The solvent must be capable of dissolving the anti-oxidants which are normally found in black rubber tires. There may be other foreign matter in black rubber tires which would tend to discolor a white wall applied thereto and the solvent should also be capable of dissolving such foreign matter. In addition, the solvent may tend to loosen some of the foreign matter in black rubber tires such as coloring matter and even fillers. The penetrating, wetting or dispersing agent should be capable of enabling the solvent to pentrate the rubber of the tire a sufficient depth to insure against any migration or flow of any of the remaining discoloring matter to the white wall which is to be applied thereto. It has been found that penetration of the solvent to a depth of approximately one-eighth of an inch is adequate for the purposes of this invention. A solution consisting of approximately 95 to 98 parts of solvent and approximately 2 to 5 parts of a penetrating agent has been found to be satisfactory in all respects. For example, approximately 95 to 98 parts of acetone (solvent) and approximately 2 to 5 parts of Tergitol NPX (penetrating agent) constitutes an excellent formula for the purposes of this invention. Tergitol NPX is made by Carbide & Carbon Chemicals Company. A more specific formula which has been found suitable is acetone 97½ parts combined with Tergitol NPX 2½ parts. Reference is here made and throughout this specification to parts by weight.

Another suitable formula is the following: Acetone approximately 80 to 85 parts, isopropanol approximately 10 to 25 parts, Tergitol NPX approximately 1 to 2 parts and carbon tetrachloride, approximately 5 parts. These materials are all liquids and they may be mixed together by stirring or in any other conventional manner. Acetone and isopropanol are the solvents and Tergitol NPX is, of course, the penetrating or dispersing agent. Carbon tetrachloride brings down or lowers the flash point and it should preferably be used in all of the formulae herein set forth. A preferred formula based upon the formula last above set forth is as follows: Acetone 85 parts, isopropanol 15 parts, Tergitol NPX 1 part and carbon tetrachloride 5 parts.

Another formula suitable for the purposes of this invention is methyl ethyl ketone approximately 85 to 90 parts, isopropanol approximately 10 to 15 parts and Aquarex D approximately 2 to 5 parts, to which should be added five parts of carbon tetrachloride as above indicated. Aquarex D is made by E. I. Dupont de Nemours Company. Methyl ethyl ketone and isopropanol constitute the solvent. Aquarex D is the penetrant or dispersant. A more specific formula along these lines is methyl ethyl ketone 90 parts, isopropanol 10 parts, Aquarex D 2 parts and carbon tetrachloride 5 parts.

Still another formula comprises the following substances: Toluene approximately 85 parts, methyl ethyl ketone approximately 15 parts, Tergitol NPX approximately 1 to 2 parts and carbon tetrachloride approximately 5 parts. In this formula toluene and methyl ethyl ketone constitute the solvent and Tergitol NPX serves as a penetrating or dispersing agent.

The area in which the tire is roughened and treated with a chemical solution depends upon the extent to which it is to be re-covered with new rubber. If it is only the outer side wall which is to be covered with new rubber, it is only that side wall which is roughened and treated with the chemical solution above described. After such treatment a disc-shaped template is placed upon the tire, concentric therewith, and a strip of non-staining black rubber is applied to the roughened side wall of the tire, around said template, with a cement or by any other suitable means. The template is removed and the tire is then placed on the apparatus above described, and more particularly, with the new strip of rubber in engagement with one of the vulcanizing plates or rings shown in Figs. 7 and 8. Heat is applied under pressure, as above described, and the new strip of black rubber is firmly secured to the outer side wall of the tire and in the operation raised beads will be formed thereon as hereinafter described. This newly applied black rubber now serves as a seat or base for a strip of white or colored rubber which may be applied thereto by means of a cement or by any other suitable means. The tire is once again placed on the apparatus hereinabove described and more especially with its newly applied strips of rubber in contact with the vulcanizing plate or ring shown in Fig. 6 and the white or colored rubber strip is thereby firmly secured to the tire by means of heat applied under pressure. Since the black rubber strip which is first applied is made of non-staining rubber, it not only does not stain or discolor the white or colored strip but it also serves as a buffer or barrier to prevent the staining materials in the old rubber from reaching said white or colored rubber strip.

The process last discussed relates to a new tire as well as to a used tire which is not to be recapped or re-covered but which is merely to be treated on its outer side wall to receive the white or colored rubber strip herein referred to. Should it be desired to recap or re-cover a used tire preparatory to applying a white or colored rubber strip thereto, the same general process above described should be followed but it should be preceded by the recapping or re-covering operation and expanded to the extent required. Thus, the entire surface of the tire which is to be recapped or re-covered is first roughened and then treated with the chemical solution hereinabove described. Treatment might consist of a bath in such solution or the application of such solution with a brush and any other method of applying a liquid solution to a solid surface may be employed. It will be understood at this point that while the treatment is superficial in the sense that the solution is applied solely to the outer surface of the tire, actually the solution penetrates the surface of the tire to be considerable depth, depending upon the period of exposure to the solution and the vigor with which it is worked into the tire. A simple bath for a period of approximately twelve minutes will enable the solution to penetrate the rubber of the tire to the extent of approximately three-thirty-seconds of an inch. The reason that this is that the surface of the rubber is roughened before the solution is applied and consequently the pores of the rubber are opened up to receive the solution. It is important to understand that the solution is to be applied only to those parts of the tire which are to be coated with new rubber.

After the roughening and solution-treating steps, a suitable cement is applied to the tire and then three strips of new rubber, namely, a top or central strip 41 which forms the tread of the tire, a side strip 42 which forms one side wall of the tire and a second side strip 43 which froms the opposite side wall of the tire. The tire is then placed in apparatus such as is shown in the drawing, but it is provided with vulcanizing plates or rings which engage both sides and the tread of the tire to vulcanize all three rubber strips thereto. Among these vulcanizing plates or rings is either of the two plates or rings shown in Figs. 7 and 8. There would also be an opposing vulcanizing ring 54 for the opposite side wall of the tire and still another ring or rings for the tread of the tire. These vulcanizing rings or plates are all conventional with the exception of the vulcanizing rings or plates which are shown in Figs. 7 and 8. The vulcanizing process is also conventional and so is the vulcanizing apparatus except for the counter-balance movable platen and the removable screw above the described and shown in Figs. 1, 2 and 3. In this process at least one strip of rubber should be of the non-staining variety, and reference is here made particularly to that strip of rubber which faces the outer side wall of the tire to which the white or colored strip is to be applied. This non-staining rubber strip, when molded and vulcanized on either of the plates or rings shown in Figs. 7 and 8, forms a buffer or barrier to prevent the flow or migration of the staining or discoloring materials from the casing of the tire and from the new rubber applied thereto to the white or colored strip. Of course, it will be understood, that all of the new rubber used to re-cover the casing may be of the non-staining variety so as to further insure against staining or discoloration of the white or colored rubber strip.

Referring now to Fig. 7, it will be observed that vulcanizing ring 17 is provided with an annular groove or channel 12. Spaced therefrom in a second groove or channel 12a. It will be understood that when rubber strip 42 is molded and vulcanized by means of vulcanizing ring 17, beads 44 and 46 will be formed in channels 12 and 12a. Between the two beads will be a depressed or recessed web portion 45. Vulcanizing ring 17' is similar to vulcanizing ring 17 in that it has an annular groove or channel 12 formed therein. But in place of groove or channel 12a is a pair of relatively smaller grooves or channels 12b and this is to be preferred. Consequently, when plate 17' is used in place of plate 17, three beads will be formed on the outer side wall of the tire, one bead being bead 44 and the other two beads being relatively small beads in the place and stead of bead 46. The difference between vulcanizing plates or rings 17 and 17' is not a critical difference and it does not affect the principles or ends of the invention. The important bead is bead 44 which is situated where the tire would be most likely to make contact with the side of a sidewalk curb and thus bead would therefore tend to prevent scuffing of the white wall. Moreover, as above indicated, this bead also serves as to edging against which the white rubber strip is laid to finish it off.

Conventional means may be employed in connection with the vulcanizing process, such as an inner tube T which is to be inserted into the tire and inflated during the operation of the process. An outer retaining ring 50 may be slipped over the tread of the tire in the event that the vulcanizing operation does not extend to the tread, as, in the case of a new tire. The tire together with its inner tube and at least one rubber strip applied to its outer side wall is now placed on platform 10 and either ring 17 or 17' mounted thereon and platen 18 is placed on top of the tire. Beads 48 and 49 of the tire and the inner tube rest against cylinder or collar 11 which now serves as an inner retaining ring. There is no showing of the vulcanizing rings which would vulvanize the tread and inner side wall of the tire since this is not part of the process herein claimed.

The flat end of screw 21 is brought into engagement through slot 27 with the bottom of platform 10 and nut 22 is turned to apply pressure upon hub 20 and through said hub and arms 19 and platen 18 to the tire itself. After the vulcanizing process is at an end, screw 21 is turned to disengage its key 26 from slot 27 and to remove platen 18 from the tire. The tire may now be removed from platform 10. It will be understood at this point that heat for the vulcanizing process is provided by means of coils 9 which are fed through an electric cord C. This is conventional and illustrative. The inner tube may now be deflated and the tire may be removed for the final step in the process which is the application of the white or colored side wall thereto. The tire is now in the condition which is illustrated in Fig. 4 and when the final step is at an end, it will have the features of the tire shown in Fig. 5.

A white or colored rubber strip 47 is now placed upon web 45 between beads 44 and 46. The tire is now placed on the apparatus shown in Fig. 1 wherein vulcanizing plate 17'' is substituted for vulcanizing plate 17. It will be noted that vulcanizing plate 17'' has an annular groove or channel 12c formed therein, corresponding to groove or channel 12, but not quite as deep. There is no channel corresponding to channel 12a and the raised area between channels 12 and 12a is depressed in vulcanizing plate 17''. Bead 44 will fit into channel 12c but rubber strip 47 will be substantially flush with bead 46 and consequently there will be no need for another channel to receive said bead 46. The entire procedure above described is once again applied, wherein a tube is placed within the tire and platen 18 is brought down upon the side wall of the tire. Vulcanizing plate 17'' will be heated and rubber strip 47 will be vulcanized and the tire will now be completed.

It has been stated that the chemical solution above described is applied to the casing of the tire before it is recapped or re-covered. It is assumed that the rubber used in the recapping or re-covering process contains no materials which would stain or discolor or otherwise adversely affect the white or colored side wall. But if the newly added rubber is of a staining nature, then the tire should also be treated with said chemical solution after it is recapped but before the white or colored side wall is applied thereto. The invention may be practiced with both natural and synthetic rubbers both completely uncured and also pre-vulcanized. Materials other than rubber may also be employed such as the various elastomers known in the art. Some of these elastomers are known to set and bond without the application of heat but rely instead upon catalyzers or catalysts of various known types in order to solidify. Strip 47, for example, may be made of any of the known rubbers in any desired color and any of the known elastomers and also of flexible plastic material such as vinyl chloride and the like. These plastics have the desirable characteristics of toughness and resilience and they may be fabricated in various colors, as desired.

In Fig. 9 is shown a modification of the screw locking means above described. In place of flat key portion 26 at the lower end of post or screw 21 is a pin-shaped key 26' which may fit into a sleeve 51 set in the center of platform 10. Slot 52 has a section 53 of greater diameter in which key 26' fits. A quarter turn of screw 21 locks said key 26' into or removes it from section 53 of slot 52. This arrangement is very much of the nature of a bayonet slot construction.

There have now been illustrated and described the preferred embodiments of the invention. It is to be understood that it is not desired to be limited to these specific embodiments since the invention is capable of many changes and modifications coming within the scope of the invention as defined in the appended claims.

I claim:

1. A method of applying a white rubber side wall to a black rubber tire containing materials capable of discoloring white rubber in contact therewith, said method comprising the steps of removing said discoloring materials from the side of said black rubber tire to a depth of approximately one-eighth of an inch, covering said side with a black rubber covering which is free from materials capable of discoloring white rubber in contact therewith, and finally applying a white rubber wall to said black rubber covering.

2. A method in accordance with claim 1, wherein a pair of spaced, concentric annular ribs are formed in the black rubber covering, defining an annular recess between them, said white rubber wall being applied to said black rubber covering in said recess with one of the edges of said white rubber wall in abutment with one of said ribs and the opposite edge of said white rubber wall in abutment with the other rib.

3. A method in accordance with claim 1, wherein the discoloring materials are removed from the side of the black rubber tire by means of a solvent capable of dissolving them out of the tire without reacting injuriously with the tire.

4. A method in accordance with claim 3, wherein acetone is used as a solvent to dissolve the discoloring materials out of the side of the black rubber tire.

5. A method in accordance with claim 3, wherein methyl ethyl ketone is used as a solvent to dissolve the discoloring materials out of the side of the black rubber tire.

6. A method in accordance with claim 3, wherein toluene is used as a solvent to dissolve the discoloring materials out of the side of the black rubber tire.

References Cited in the file of this patent

UNITED STATES PATENTS

| Number | Name | Date |
|---|---|---|
| D. 128,632 | Lee | Aug. 5, 1941 |
| D. 171,451 | Kraft | Feb. 9, 1954 |
| 1,448,286 | Comstock | Mar. 13, 1923 |
| 1,458,629 | Raymond | June 12, 1923 |
| 1,479,497 | Cutler | Jan. 1, 1924 |
| 1,900,951 | Richter et al. | Mar. 14, 1933 |
| 2,477,718 | Breth | Aug. 2, 1949 |
| 2,488,863 | Haase | Nov. 22, 1949 |
| 2,501,644 | Kraft et al. | Mar. 21, 1950 |
| 2,541,506 | Cuthbertson et al. | Feb. 13, 1951 |
| 2,572,259 | Gottschall | Oct. 23, 1951 |
| 2,685,904 | Brandau | Aug. 10, 1954 |

OTHER REFERENCES

"Chemistry and Technology of Rubber," Davis and Blake, Monograph Series No. 74, 1937, page 91, "Purification of Caotchouc."